United States Patent [19]
Fujiyama

[11] Patent Number: 6,009,493
[45] Date of Patent: *Dec. 28, 1999

[54] DATA TRANSFER CONTROL METHOD AND APPARATUS FOR PERFORMING CONSECUTIVE BURST TRANSFER OPERATIONS WITH A SIMPLE STRUCTURE

[75] Inventor: Hiroyuki Fujiyama, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/824,761

[22] Filed: Mar. 26, 1997

[30] Foreign Application Priority Data

Oct. 18, 1996 [JP] Japan .................................... 8-275166

[51] Int. Cl.⁶ .................................................... G06F 12/00
[52] U.S. Cl. ............................... 711/1; 711/217; 711/220; 711/214
[58] Field of Search ........................ 365/189.05, 189.04; 395/846, 290, 308, 566; 711/201

[56] References Cited

U.S. PATENT DOCUMENTS

| | | | |
|---|---|---|---|
| 4,344,156 | 8/1982 | Eaton, Jr. et al. | 365/189.05 |
| 4,467,454 | 8/1984 | Kurosu et al. | 365/189.04 |
| 4,864,533 | 9/1989 | Hanada | 395/846 |
| 5,054,565 | 10/1991 | Kinnan | 175/19 |
| 5,343,427 | 8/1994 | Teruyama | 365/189.04 |
| 5,357,469 | 10/1994 | Sommer et al. | 365/193 |
| 5,469,544 | 11/1995 | Aatresh et al. | 395/290 |
| 5,485,889 | 1/1996 | Gray | 174/61 |
| 5,535,835 | 7/1996 | Walker | 175/73 |
| 5,634,139 | 5/1997 | Takita | 395/855 |
| 5,734,849 | 3/1998 | Butcher | 395/308 |
| 5,740,394 | 4/1998 | Minemura et al. | 5/411 |
| 5,748,630 | 5/1998 | Bergantino et al. | 395/566 |

*Primary Examiner*—John W. Cabeca
*Assistant Examiner*—Fred F. Tzeng
*Attorney, Agent, or Firm*—Staas & Halsey, LLP

[57] ABSTRACT

A method and apparatus for controlling transfer of data in which a plurality of burst transfer operations starting from an arbitrary byte as a start address are performed consecutively without a high-speed adder provided in the conventional data transfer apparatus performing burst transfer. Data is transferred between memories by a plurality of consecutive burst transfer operations performed on data stored in consecutive addresses. Each of the burst transfer operations is performed on the data stored in a respective one of memory cell areas each of which corresponds to a unit of burst transfer. A first address representing an address of one of the memory cell areas storing data to be transferred is calculated. The first address is a part of a start address of a second or later burst transfer operation. A second address representing an address of one of memory cells provided in the one of the memory cell areas is calculated separately. The data transfer operation is started from the one of the memory cells. The second address is a part of the start address of the second or later burst transfer operation.

12 Claims, 8 Drawing Sheets

FIG. 4

| | | | | | | | | |
|---|---|---|---|---|---|---|---|---|
| 11 { | 0 0 | 0 1 | 0 2 | 0 3 | 0 4 | 0 5 | 0 6 | 0 7 | ← D1 |
| | 0 8 | 0 9 | 0 A | 0 B | 0 C | 0 D | 0 E | 0 F | ← D2 |
| | 1 0 | 1 1 | 1 2 | 1 3 | 1 4 | 1 5 | 1 6 | 1 7 | ← D3 |
| | 1 8 | 1 9 | 1 A | 1 B | 1 C | 1 D | 1 E | 1 F | ← D4 |
| 12 { | 2 0 | 2 1 | 2 2 | 2 3 | 2 4 | 2 5 | 2 6 | 2 7 | ← D5 |
| | 2 8 | 2 9 | 2 A | 2 B | 2 C | 2 D | 2 E | 2 F | ← D6 |
| | 3 0 | 3 1 | 3 2 | 3 3 | 3 4 | 3 5 | 3 6 | 3 7 | ← D7 |
| | 3 8 | 3 9 | 3 A | 3 B | 3 C | 3 D | 3 E | 3 F | ← D8 |
| 13 { | 4 0 | 4 1 | 4 2 | 4 3 | 4 4 | 4 5 | 4 6 | 4 7 | ← D9 |
| | 4 8 | 4 9 | 4 A | 4 B | 4 C | 4 D | 4 E | 4 F | ← D10 |
| | 5 0 | 5 1 | 5 2 | 5 3 | 5 4 | 5 5 | 5 6 | 5 7 | ← D11 |
| | 5 8 | 5 9 | 5 A | 5 B | 5 C | 5 D | 5 E | 5 F | ← D12 |
| 14 { | 6 0 | 6 1 | 6 2 | 6 3 | 6 4 | 6 5 | 6 6 | 6 7 | ← D13 |
| | 6 8 | 6 9 | 6 A | 6 B | 6 C | 6 D | 6 E | 6 F | ← D14 |
| | 7 0 | 7 1 | 7 2 | 7 3 | 7 4 | 7 5 | 7 6 | 7 7 | ← D15 |
| | 7 8 | 7 9 | 7 A | 7 B | 7 C | 7 D | 7 E | 7 F | ← D16 |

FIG. 7

| EXTERNAL CLOCK CYCLE ↓ | START ADDRESS (HEXADECIMAL) ↓ | DATA ↓ | |
|---|---|---|---|
| 1 | 00000000 | D 1 | ⎫ |
| 2 | — | D 2 | ⎬ FIRST BURST TRANSFER |
| 3 | — | D 3 | |
| 4 | — | D 4 | ⎭ |
| 5 | 00000020 | D 5 | ⎫ |
| 6 | — | D 6 | ⎬ SECOND BURST TRANSFER |
| 7 | — | D 7 | |
| 8 | — | D 8 | ⎭ |
| 9 | 00000040 | D 9 | ⎫ |
| 10 | — | D 10 | ⎬ THIRD BURST TRANSFER |
| 11 | — | D 11 | |
| 12 | — | D 12 | ⎭ |

FIG. 8

| EXTERNAL CLOCK CYCLE ↓ | START ADDRESS (HEXADECIMAL) ↓ | DATA ↓ | |
|---|---|---|---|
| 1 | 0 0 0 0 0 0 0 3 | D 1 | ⎫ |
| 2 | — | D 2 | ⎬ FIRST BURST TRANSFER |
| 3 | — | D 3 | ⎬ |
| 4 | — | D 4 | ⎭ |
| 5 | 0 0 0 0 0 0 2 3 | D 5 | ⎫ |
| 6 | — | D 6 | ⎬ SECOND BURST TRANSFER |
| 7 | — | D 7 | ⎬ |
| 8 | — | D 8 | ⎭ |
| 9 | 0 0 0 0 0 0 4 3 | D 9 | ⎫ |
| 1 0 | — | D 1 0 | ⎬ THIRD BURST TRANSFER |
| 1 1 | — | D 1 1 | ⎬ |
| 1 2 | — | D 1 2 | ⎭ |
| 1 3 | 0 0 0 0 0 0 6 3 | D 1 3 | ⎫ |
| 1 4 | — | (D 1 4) | ⎬ FOURTH BURST TRANSFER |
| 1 5 | — | (D 1 5) | ⎬ |
| 1 6 | — | (D 1 6) | ⎭ |

DATA TRANSFER CONTROL METHOD AND APPARATUS FOR PERFORMING CONSECUTIVE BURST TRANSFER OPERATIONS WITH A SIMPLE STRUCTURE

BACKGROUND OF THE INVENTION

1. Field of the Invention

The present invention relates to a method and apparatus for controlling transfer of data and, more particularly, to a method and apparatus for controlling transfer of data using a burst transfer method which is generally performed in a data processing system.

2. Description of the Related Art

FIG. 1 is a block diagram of a part of a conventional data processing system in which a burst transfer operation is performed. In FIG. 1, an arithmetic processor 1 processes data. A memory 2 is an external memory comprising a dynamic random access memory (DRAM) having a capacity of 4 giga-bytes and a burst transfer mode. An external address bus 3 has a 32-bit structure. An external address bus 4 has a 64-bit structure.

FIGS. 2A–2E represent is a timing chart of a burst transfer operation performed between the arithmetic processor 1 and the external memory 2. FIG. 2A shows an external clock signal. FIG. 2B shows the state of a bus request signal output from the arithmetic processor 1 for requesting use of a bus. FIG. 2C shows a state of a bus acknowledge signal provided to the arithmetic processor 1 to permit use of a bus. FIG. 2D shows the state of the external address bus 3. FIG. 2E shows the state of the external address bus 4.

In the example shown in FIGS. 2A–2E, an address A1 is output to the external address bus 3 as a start address of the first cycle of burst transfer after a permission of use of the bus is provided upon the request for use of the bus output from the arithmetic processor 1. Then, the sets of data D1–D4 are sequentially output to the external address bus 4 in the order D1→D2→D3→D4. Thus, a burst transfer (a store transfer for the external memory 2 or a load transfer for an internal memory of the arithmetic processor 1) is performed for the sets of data D1–D4.

Thereafter, an address A2 is output to the external address bus 3 as a start address of the second cycle of burst transfer. Then, the sets of data D5–D8 are sequentially output to the external address bus 4 in the order D5→D6→D7→D8. Thus, a burst transfer is performed for the sets of data D5–D8.

Thereafter, an address A3 is output to the external address bus 3 as a start address of the third cycle of burst transfer. Then, the sets of data D9–D12 are sequentially output to the external address bus 4 in the order D9→D10→D11→D12. Thus, a burst transfer operation is performed for the sets of data D9–D12.

In the above-mentioned example, a number of consecutive sets of data transferred by a single burst transfer, which is referred to as a burst length, is 4. In this case, the period for calculating the address is one fourth of that of a case where the address is output for each of the sets of data D1–D12 for each clock pulse. This allows the design of a high-speed data processing system.

In the conventional burst transfer, the word length typically comprises several bytes, for example, 4 bytes or 8 bytes, so as to perform the data transfer on the word basis. Thus, it is no longer standard to perform a data transfer in which the transfer is started from an arbitrary byte, as a start address, in a single word.

When a plurality of burst transfer operations starting from an arbitrary byte as a start address are performed consecutively, it is required to calculate the start address for each clock signal pulse if the start address for the second and later burst transfer operations is determined by counting the number of words which have been transferred. Thus, there is a problem in that a high-speed adder for the address calculation is needed.

SUMMARY OF THE INVENTION

It is a general object of the present invention to provide a method and apparatus for controlling transfer of data in which the above-mentioned problems are eliminated.

A more specific object of the present invention is to provide a method and apparatus for controlling transfer of data in which a plurality of burst transfer operations starting from an arbitrary byte as a start address are performed consecutively without a high-speed adder provided in the conventional data transfer apparatus performing burst transfer.

In order to achieve the above-mentioned objects, there is provided, according to one aspect of the present invention, a data transfer control method for controlling transfer of data between memories by a plurality of consecutive burst transfer operations performed on data stored in consecutive addresses, each of the burst transfer operations being performed on the data stored in a respective one of memory cell areas, each of which corresponds to a unit of burst transfer, the data transfer control method comprising the steps of:

a) calculating a first address representing an address of one of the memory cell areas storing data to be transferred, the first address being a part of a start address of a second or later burst transfer operation; and b) calculating second address representing an address of one of memory cells provided in the one of the memory cell areas, a data transfer operation being started from the one of the memory cells, the second address being a part of the start address of the second or later burst transfer operation.

According to the above-mentioned invention, a calculation of the start address of the second or later burst transfer operation is performed by two separate operations. One of the operations is the calculation of the address of the memory cell area which corresponds to a unit of burst transfer. The other of the operations is the calculation of the address provided in the memory cell area which corresponds to a unit of burst transfer. Thus, there is no need to calculate the address for each clock pulse when a plurality of burst transfer operations, in each of which data including an arbitrary number of bytes is transferred, can be consecutively performed with an arbitrary start address. Accordingly, there is no need to provide an adder having an operation speed higher than that of the adder provided in the conventional burst transfer control unit.

In the data transfer control method according to the present invention, each of the memory cells may have a capacity of m bits and may be provided with addresses each of which comprises n bits, an address of each of the memory cell areas being represented by higher order n-x bits, a burst transfer operation being performed based on a word length being $2^{x-y}*m$ bits and a burst length being $2^y$, where m, n, x and y are integers satisfying a relationship $n>x>y\geq 1$, wherein a calculation of step a) is performed by incrementing a first higher order value represented by higher order n-x bits of a start address of a first burst transfer operation each time a request for a burst transfer operation is made; and a calculation of step b) is performed by summing a first lower order value represented by lower order x bits of a number of addresses from which data is transferred and a second lower order value represented by lower order x bits of the start address of the first burst transfer operation.

The data transfer control method according to the present invention may further comprise the step of:

c) controlling the number of burst transfer operations to be performed after the second burst transfer operation by calculating a number of burst transfer operations after the second burst transfer operation based on the number of addresses from which the data is to be transferred and the start address of the first burst transfer operation.

Additionally, step c) may include the steps of:

c-1) calculating a number of burst transfer operations after the second burst transfer operation based on the first lower order value and the second lower order value; and c-2) decrementing the number of burst transfer operations to be performed each time a request for a burst transfer operation is made so as to instruct an end of the burst transfer operations when the number of burst transfer operations to be performed becomes zero.

Additionally, a calculation of the number of burst transfer operations to be performed may be performed by summing a second higher order value represented by higher order n-x bits of the number of addresses from which data is to be transferred, minus one, and a first value represented by (x+1)th order of a second value obtained by summing the second lower order value and a third lower order value represented by lower order x bits of the number of addresses, from which the data is to be transferred, minus one.

Additionally, there is provided, according to another aspect of the present invention, a data transfer control apparatus for controlling transfer of data between memories by a plurality of consecutive burst transfer operations performed on data stored in consecutive addresses, each of the burst transfer operations being performed on the data stored in a respective one of memory cell areas each of which corresponds to a unit of burst transfer, the data transfer control apparatus comprising:

a first address calculating unit calculating a first address representing an address of one of the memory cell areas storing data to be transferred, the first address being a part of a start address of a second or later burst transfer operation; and a second address calculating unit calculating a second address representing an address of one of memory cells provided in the one of the memory cell areas, a data transfer operation being started from the one of the memory cells, the second address being a part of the start address of the second or later burst transfer operation.

According to the above-mentioned invention, a calculation of the start address of the second or later burst transfer operation is performed by the first address calculating unit and the second address calculating unit. The first address calculating unit calculates the address of the memory cell area which corresponds to a unit of burst transfer. The second address calculating unit calculates the address provided in the memory cell area which corresponds to a unit of burst transfer. Thus, there is no need to calculate the address for each clock pulse when a plurality of burst transfer operations, in each of which data including an arbitrary number of bytes is transferred, can be consecutively performed with an arbitrary start address. Accordingly, there is no need to provide an adder having an operation speed higher than that of the adder provided in the conventional burst transfer control unit.

In the data transfer control apparatus according to the present invention, each of the memory cells may have a capacity of m bits and may be provided with addresses each of which comprises n bits, an address of each of the memory cell areas being represented by higher order n-x bits, a burst transfer operation being performed based on a word length being $2^{x-y}*m$ bits and a burst length being $2^y$, where m, n, x and y are integers satisfying a relationship n>x>y≧1, wherein the first address calculating unit comprises a first adder incrementing a first higher order value represented by higher order n-x bits of a start address of a first burst transfer operation each time a request for a burst transfer operation is made; and the second address calculating unit sums a first lower order value represented by lower order x bits of a number of addresses from which data is to be transferred and a second lower order value represented by lower order x bits of the start address of the first burst transfer operation.

The data transfer control apparatus according to the present invention may further comprise:

a burst control unit controlling the number of burst transfer operations to be performed after the second burst transfer operation by calculating a number of burst transfer operations after the second burst transfer operation based on the number of addresses from which the data is to be transferred and the start address of the first burst transfer operation.

Additionally, the burst control unit may include:

a second adder summing the second lower order value and a third lower order value represented by lower order x bits of the number of addresses from which the data is to be transferred, minus one;

a third adder summing a carry of the second adder and a second higher order value represented by higher order n-x bits of the number of addresses from which data is to be transferred, minus one;

a subtracter decrementing the number of burst transfer operations to be performed each time a request for a burst transfer operation is made, an initial value of the subtracter being set to an output of the third adder; and a determination circuit determining whether an output of the subtracter is zero so as to output a signal instructing an end of a burst transfer when the output of the subtracter is zero.

Additionally, the second address calculating unit may include a fourth adder adding one to an output of the second adder.

Other objects, features and advantages of the present invention will become more apparent from the following description when read in conjunction with the accompanying drawings.

BRIEF DESCRIPTION OF THE DRAWINGS

FIG. 4 is an illustration showing a part of a memory map of an external memory shown in FIG. 3;

FIG. 7 is an illustration for explaining an operation of a DMA controller shown in FIG. 3; and FIG. 8 is an illustration for explaining another operation of the DMA controller shown in FIG. 3.

DETAILED DESCRIPTION OF THE PREFERRED EMBODIMENTS

Figure 1:
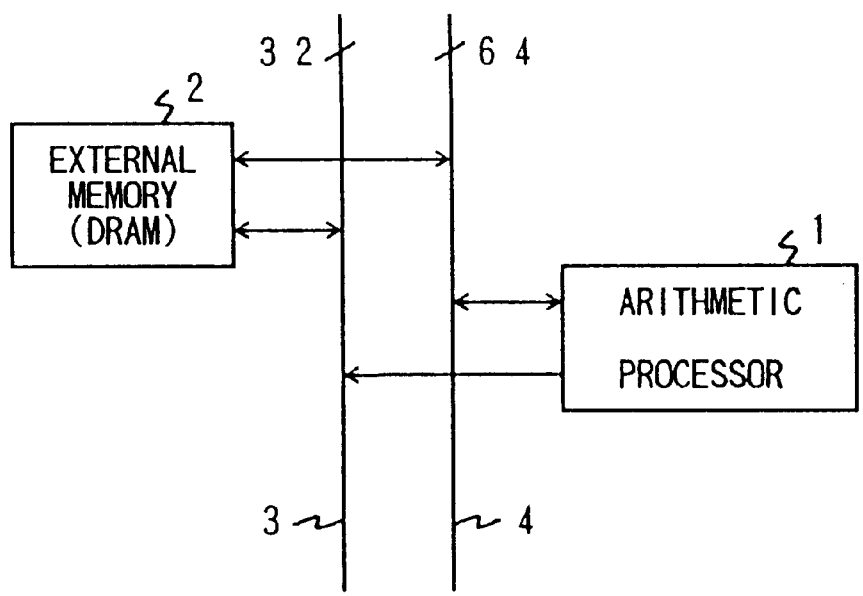
FIG. 1 is a block diagram of a part of a conventional data processing system in which a burst transfer operation is performed.
Figure 2:
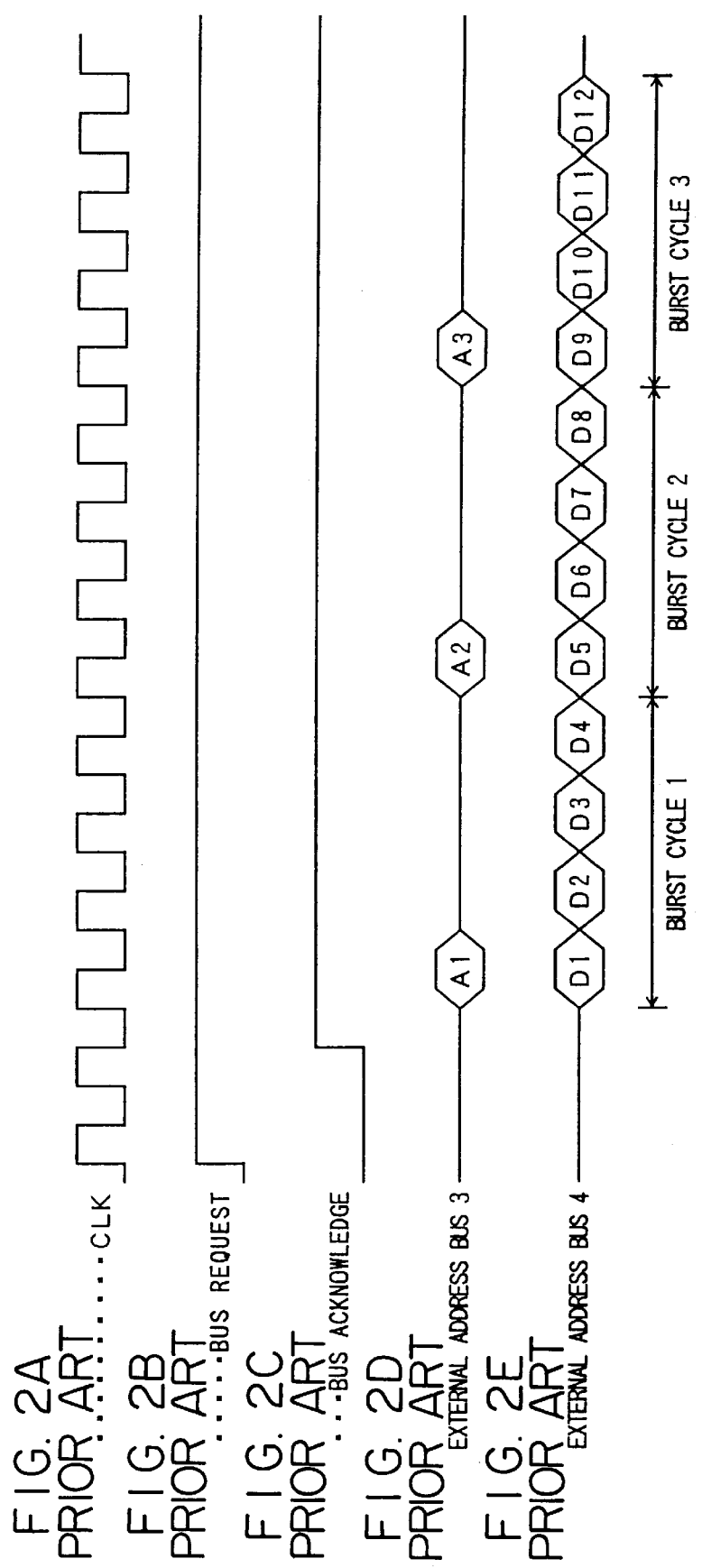
FIGS. 2A–2E represent a timing chart of a burst transfer operation performed between an arithmetic processor and an external memory 2 shown in FIG. 1.
Figure 3:
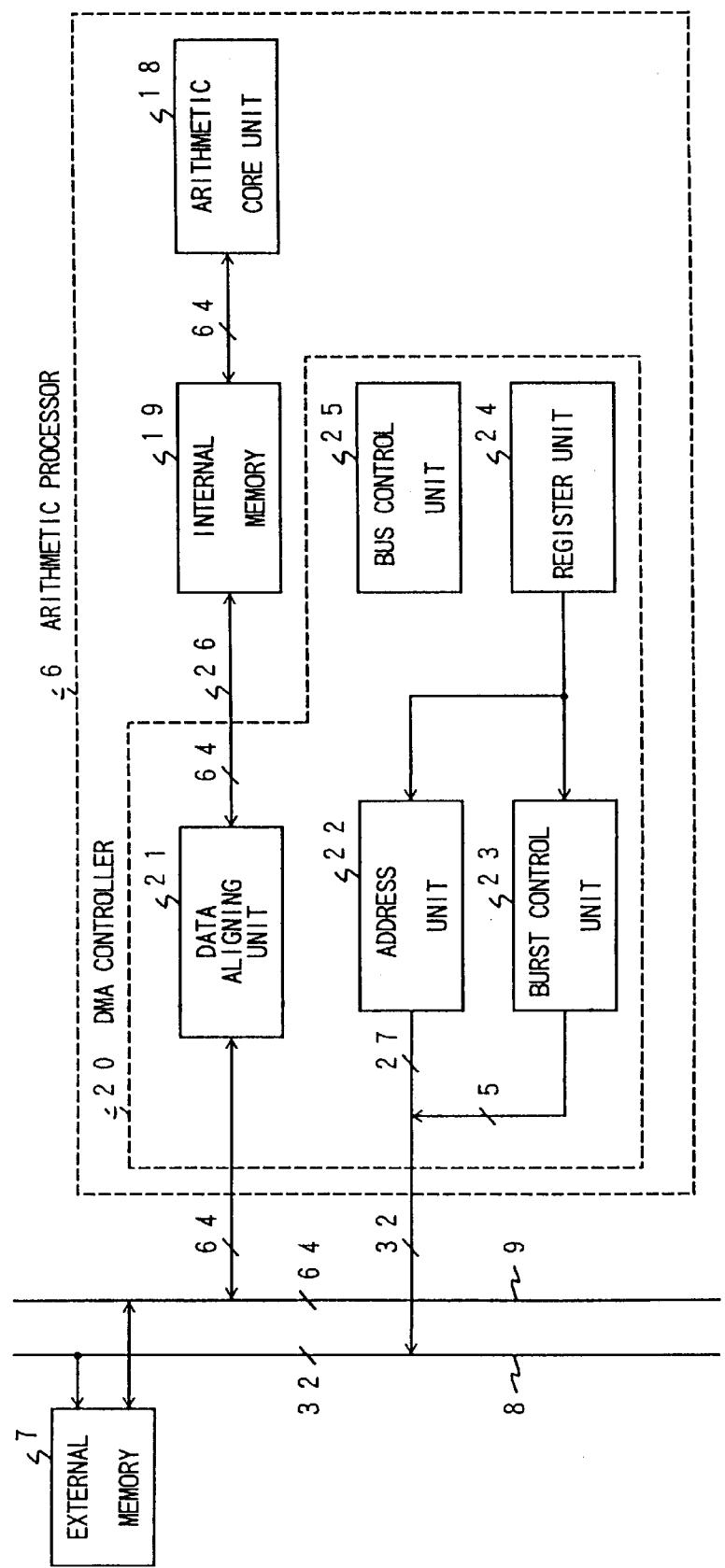
FIG. 3 is a block diagram of a part of a data processing system having an arithmetic processor provided with a direct memory access (DMA) controller according to a first embodiment of the present invention.

A description will now be given, with reference FIG. 3, of a first embodiment of the present invention. FIG. 3 is a block diagram of a part of a data processing system having an arithmetic processor provided with a direct memory access (DMA) controller according to the first embodiment of the present invention.

The part of the data processing system shown in FIG. 3 comprises an arithmetic processor 6 which processes data, an external memory 7 which comprises a DRAM having a burst transfer mode with a capacity of 4 giga-bytes, an external address bus 8 having a 32-bit structure and an external address bus 9 having a 64-bit structure.

The external memory 7 is constructed to perform a burst transfer operation by providing an address composed of 32 bits as a byte basis and having a word length of 8 bytes and a burst length of 4.

FIG. 4 is an illustration showing a part of a memory map of the external memory 7. The addresses shown in FIG. 4 are represented by the hexadecimal number system.

In FIG. 4, a portion 11 indicates a memory area which includes an address area including addresses whose higher order 27 bits are 000 . . . $000_2$ (27 zero-bits), where and hereinafter a numeral provided with the suffix 2 indicates a numeral represented by the binary number system which constitutes unit data of burst transfer. That is, the addresses corresponding to $0_{10}$ to $31_{10}$ are included in the memory area 11, where and hereinafter a numeral provided with the suffix 10 indicates a numeral represented by the decimal number system. The addresses $0_{10}$ to $31_{10}$ represented by the decimal number system correspond to 000 . . . $000000_2$ (32 zero bits) to 000 . . . $011111_2$ (27 zero-bits plus 5 one-bits). Additionally, the addresses $0_{10}$ to $31_{10}$ represented by the decimal number system can be represented, as shown in FIG. 4, by the numerals $(00000000_{16})$ to $(0000001F_{16})$ indicated by the hexadecimal number system, respectively, where and hereinafter a numeral provided with the suffix 16 indicates a numeral represented by the hexadecimal number system.

A portion 12 indicates a memory area which includes an address area including addresses whose higher order 27 bits are 000 . . . $001_2$ (26 zero-bits plus 1 one-bit). That is, the addresses corresponding to $32_{10}$ to $63_{10}$ are included in the memory area 12. The addresses $32_{10}$ to $63_{10}$ represented by the decimal number system correspond to 000 . . . $0100000_2$ (26 zero-bits plus 1 one-bit plus 5 zero-bits) to 000 . . . $0111111_2$ (26-zero bits plus 6 one-bits). Additionally, the addresses $32_{10}$ to $63_{10}$ represented by the decimal number system can be represented, as shown in FIG. 4, by the hexadecimal numerals $(00000020_{16})$ to $(0000003F_{16})$, respectively.

A portion 13 indicates a memory area which includes an address area including addresses whose higher order 27 bits are 000 . . . $010_2$ (25 zero-bits plus 1 one-bit plus 1 zero-bit). That is, the addresses corresponding to $64_{10}$ to $95_{10}$ are included in the memory area 13. The addresses $64_{10}$ to $95_{10}$ represented by the decimal number system correspond to 000 . . . $01000000_2$ (25 zero-bits plus 1 one-bit plus 6 zero-bits) to 000 . . . $1011111_2$ (25-zero bits plus 1 one-bit plus 1 zero-bit plus 5 one-bits). Additionally, the addresses $64_{10}$ to $95_{10}$ represented by the decimal number system can be represented, as shown in FIG. 4, by the hexadecimal numerals $(00000040_{16})$ to $(0000005F_{16})$, respectively.

A portion 14 indicates a memory area which includes an address area including addresses whose higher order 27 bits are 000 . . . $011_2$ (25 zero-bits plus 2 one-bits). That is, the addresses corresponding to $96_{10}$ to $127_{10}$ are included in the memory area 13. The addresses $96_{10}$ to $127_{10}$ represented by the decimal number system correspond to 000 . . . $01100000_2$ (25 zero-bits plus 2 one-bits plus 5 zero-bits) to 000 . . . $01111111_2$ (25-zero bits plus 7 one-bits). Additionally, the addresses $96_{10}$ to $127_{10}$ represented by the decimal number system can be represented, as shown in FIG. 4, by the hexadecimal numerals $(00000060_{16})$ to $(0000007F_{16})$, respectively.

Additionally, D1 indicates word data including addresses $0_{10}$ to $7_{10}$ which correspond to addresses 000 . . . $000_2$ to 000 . . . $111_2$, respectively. In FIG. 4, the addresses $0_{10}$ to $7_{10}$ are represented as the hexadecimal numerals $(00000000_{16})$ to $(00000007_{16})$, respectively.

Similarly, D2 indicates word data including addresses $8_{10}$ to $15_{10}$ which correspond to addresses 000 . . . $01000_2$ to 000 . . . $01111_2$, respectively. In FIG. 4, the addresses $8_{10}$ to $15_{10}$ are represented as the hexadecimal numerals $(00000008_{16})$ to $(0000000F_{16})$, respectively.

Similarly, D3 indicates word data including addresses $16_{10}$ to $23_{10}$ which correspond to addresses 000 . . . $010000_2$ to 000 . . . $010111_2$, respectively. In FIG. 4, the addresses $16_{10}$ to $23_{10}$ are represented as the hexadecimal numerals $(00000010_{16})$ to $(00000017_{16})$, respectively.

Similarly, D4 indicates word data including addresses $24_{10}$ to $31_{10}$ which correspond to addresses 000 . . . $011000_2$ to 000 . . . $011111_2$, respectively. In FIG. 4, the addresses $24_{10}$ to $31_{10}$ are represented as the hexadecimal numerals $(00000018_{16})$ to $(0000001F_{16})$, respectively.

Similarly, D5 indicates word data including addresses $32_{10}$ to $39_{10}$ which correspond to addresses 000 . . . $0100000_2$ to 000 . . . $0100111_2$, respectively. In FIG. 4, the addresses $32_{10}$ to $39_{10}$ are represented as the hexadecimal numerals $(00000020_{16})$ to $(00000027_{16})$, respectively.

Similarly, D6 indicates word data including addresses $40_{10}$ to $47_{10}$ which correspond to addresses 000 . . . $0101000_2$ to 000 . . . $0101111_2$, respectively. In FIG. 4, the addresses $40_{10}$ to $47_{10}$ are represented as the hexadecimal numerals $(00000028_{16})$ to $(0000002F_{16})$, respectively.

Similarly, D7 indicates word data including addresses $48_{10}$ to $55_{10}$ which correspond to addresses 000 . . . $011000_2$ to 000 . . . $110111_2$, respectively. In FIG. 4, the addresses $48_{10}$ to $55_{10}$ are represented as the hexadecimal numerals $(00000030_{16})$ to $(00000037_{16})$, respectively.

Similarly, D8 indicates word data including addresses $56_{10}$ to $63_{10}$ which correspond to addresses 000 . . . $0111000_2$ to 000 . . . $0111111_2$, respectively. In FIG. 4, the addresses $56_{10}$ to $63_{10}$ are represented as the hexadecimal numerals $(00000038_{16})$ to $(0000003F_{16})$, respectively.

Similarly, D9 indicates word data including addresses $64_{10}$ to $71_{10}$ which correspond to addresses 000 . . . $01000000_2$ to 000 . . . $01000111_2$, respectively. In FIG. 4, the addresses $64_{10}$ to $71_{10}$ are represented as the hexadecimal numerals ($00000040_{16}$) to ($00000047_{16}$), respectively.

Similarly, D10 indicates word data including addresses $72_{10}$ to $79_{10}$ which correspond to addresses $000\ldots01001000_2$ to $000\ldots01001111_2$, respectively. In FIG. 4, the addresses $72_{10}$ to $79_{10}$ are represented as the hexadecimal numerals ($00000048_{16}$) to ($0000004F_{16}$), respectively.

Similarly, D11 indicates word data including addresses $80_{10}$ to $87_{10}$ which correspond to addresses $000\ldots01010000_2$ to $000\ldots01010111_2$, respectively. In FIG. 4, the addresses $80_{10}$ to $87_{10}$ are represented as the hexadecimal numerals ($00000050_{16}$) to ($00000057_{16}$), respectively.

Similarly, D12 indicates word data including addresses $88_{10}$ to $95_{10}$ which correspond to addresses $000\ldots01011000_2$ to $000\ldots01011111_2$, respectively. In FIG. 4, the addresses $88_{10}$ to $95_{10}$ are represented as the hexadecimal numerals ($00000058_{16}$) to ($0000005F_{16}$), respectively.

Similarly, D13 indicates word data including addresses $96_{10}$ to $103_{10}$ which correspond to addresses $000\ldots01100000_2$ to $000\ldots01100111_2$, respectively. In FIG. 4, the addresses $96_{10}$ to $103_{10}$ are represented as the hexadecimal numerals ($00000060_{16}$) to ($00000067_{16}$), respectively.

Similarly, D14 indicates word data including addresses $104_{10}$ to $111_{10}$ which correspond to addresses $000\ldots01101000_2$ to $000\ldots01101111_2$, respectively. In FIG. 4, the addresses $104_{10}$ to $111_{10}$ are represented as the hexadecimal numerals ($00000068_{16}$) to ($0000006F_{16}$), respectively.

Similarly, D15 indicates word data including addresses $112_{10}$ to $119_{10}$ which correspond to addresses $000\ldots01110000_2$ to $000\ldots01110111_2$, respectively. In FIG. 4, the addresses $112_{10}$ to $119_{10}$ are represented as the hexadecimal numerals ($00000070_{16}$) to ($00000077_{16}$), respectively.

Similarly, D16 indicates word data including addresses $120_{10}$ to $127_{10}$ which correspond to addresses $000\ldots01111000_2$ to $000\ldots01111111_2$, respectively. In FIG. 4, the addresses $120_{10}$ to $127_{10}$ are represented as the hexadecimal numerals ($00000078_{16}$) to ($0000007F_{16}$), respectively.

As shown in FIG. 3, the arithmetic processor 6 comprises a calculation core unit 18 including a calculating circuit and a calculation control circuit, an internal memory 19 and a DMA controller 20 which is the first embodiment of the data transfer controlling apparatus according to the present invention.

The DMA controller 20 performs data transfer operations from the external memory 7 to the internal memory 19 and from the internal memory 19 to the external memory 7 in accordance with a transfer controlling method according to the present invention.

In the present embodiment, the DMA controller 20 comprises a data aligning unit 21, an address unit 22, a burst control unit 23, a register unit 24 and a bus control unit 25.

The data aligning unit 21 performs an aligning control (rearrangement of data on a byte unit basis) according to the position of a data byte with respect to the data transfer operation between the external data bus 9 and an internal data bus 26.

The address unit 22 corresponds to a first address unit, and outputs the higher order 27 bits of the start address of a burst transfer operation to a portion of the external address bus 8 corresponding to the higher order 27 bits.

The burst control unit 23 calculates the number of burst transfer operations to be consecutively performed so as to control the number of sets of data transferred by the burst transfer operations. Additionally, the burst control unit 23 outputs the lower 5 bits of the start address of the burst transfer operation to a portion of the external address bus 8 corresponding to the lower 5 bits.

The register unit 24 designates the transfer mode (load transfer or store transfer), a start operation, the start address of a burst transfer operation and the number of data bytes to be transferred.

The bus control unit 25 controls a timing signal of the bus and a control of each module according to the contents set in the register unit 24.

Figure 5:
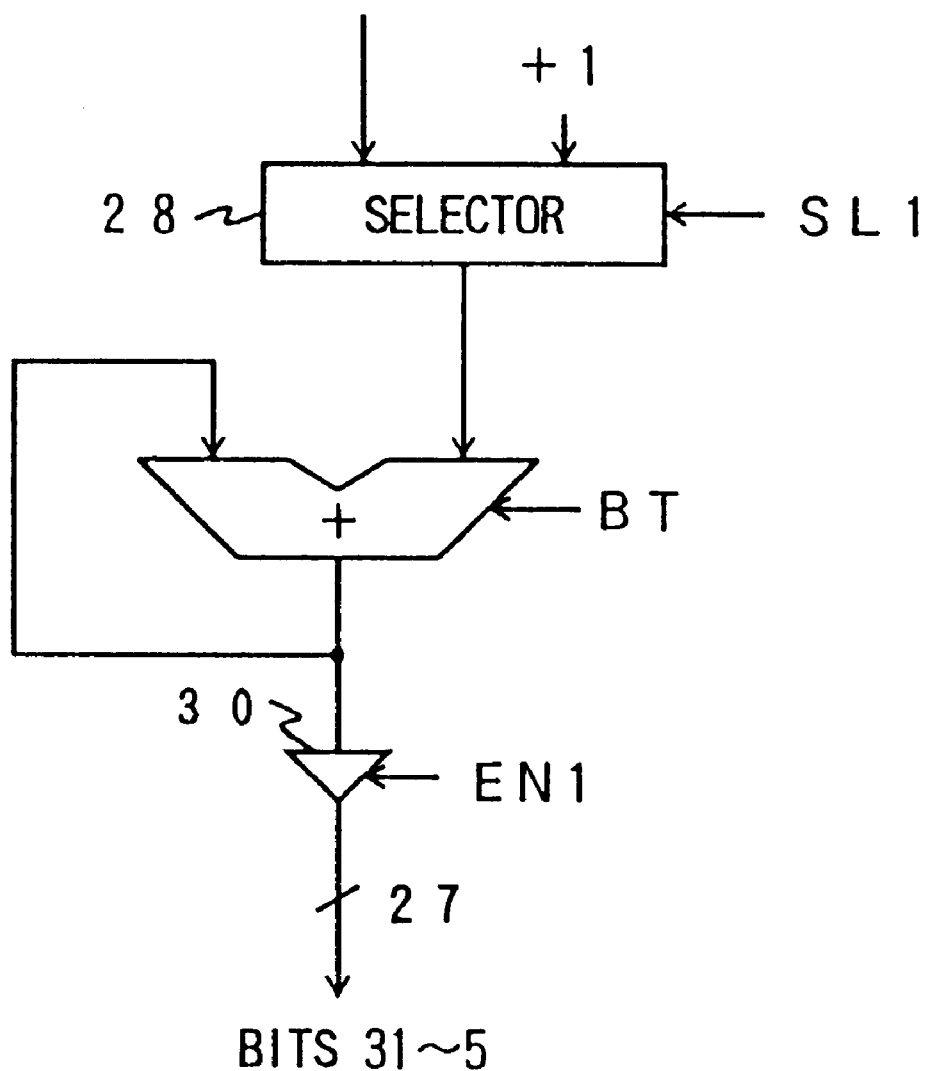
FIG. 5 is a circuit diagram of an address unit shown in FIG. 3.

FIG. 5 is a circuit diagram of the address unit 22. In FIG. 5, a selector 28 selects either the higher order 27 bits of the start address of the first burst transfer operation or +1 and outputs the result to an adder 29. A selection control signal SL1 is provided to the selector 28 so as to control the selecting operation of the selector 28.

When the selection control signal SL1 is equal to 1 (SL1=1), the selector 28 selects the higher order 27 bits. When the selection control signal SL1 is equal to zero (SL1=0), the selector 28 selects +1.

The adder 29 is provided for setting the higher order 27 bits of the start address of the first burst transfer operation as an initial value and incrementing the initial value every 4 clock pulses. The output of the adder 29 is supplied to a group of three-state buffers 30 which is turned on and off by an output enable signal EN1.

Figure 6:
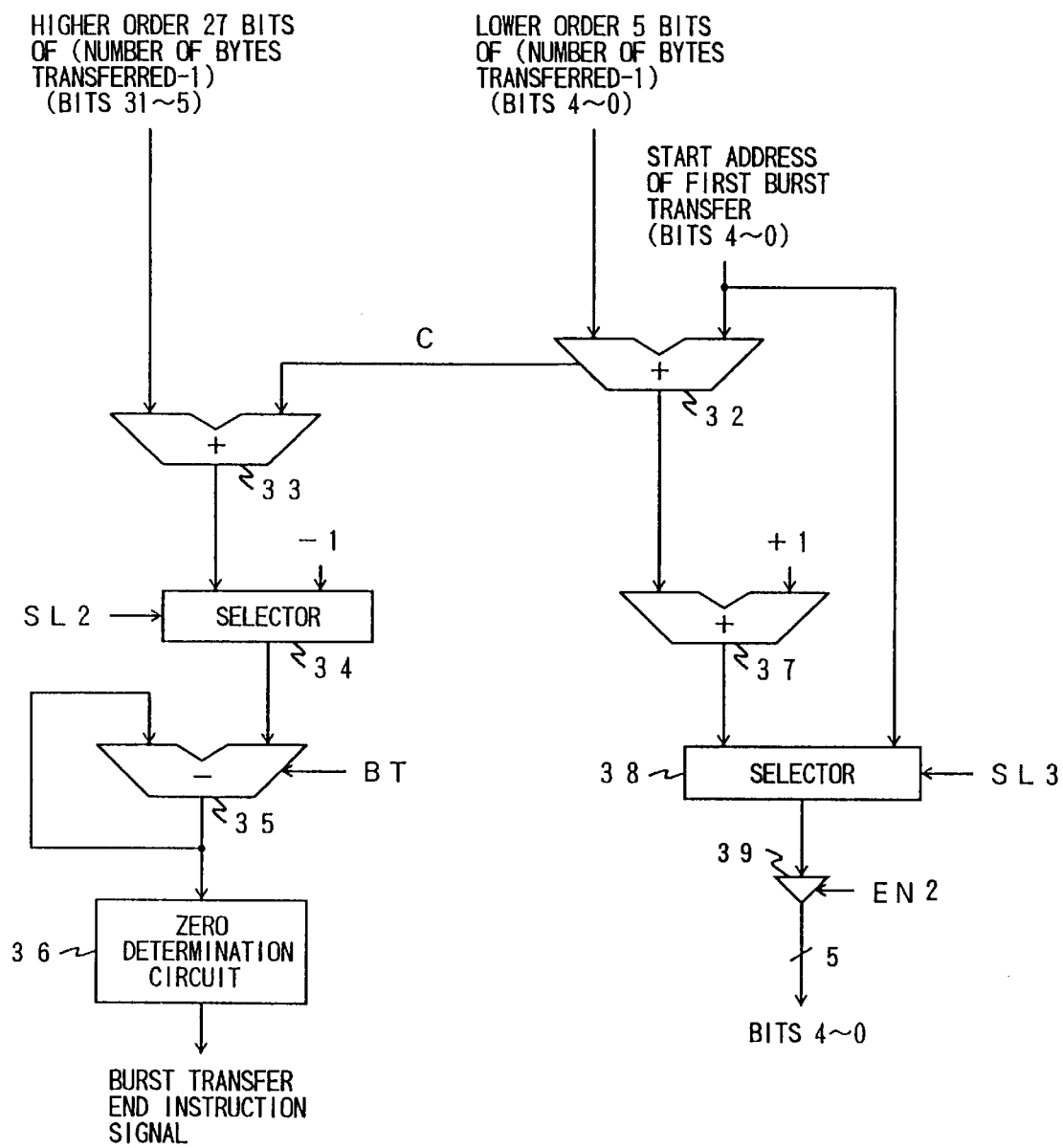
FIG. 6 is a circuit diagram of a burst control unit shown in FIG. 3.

FIG. 6 is a circuit diagram of the burst control unit 23. In FIG. 6, an adder 32 sums the lower order 5 bits which are obtained from the number of bytes to be transferred minus one and the lower order 5 bits of the start address of the first transfer operation.

An adder 33 adds the carry C of the adder 32 to the higher order 27 bits of the number of bytes to be transmitted minus one. A selector 34 selects one of the output of the adder 33 and −1, and outputs the result to a subtractor 35. The selecting operation of the selector 34 is controlled by a selection control signal SL2.

When the selection control signal SL2 is equal to 1 (SL2=1), the selector 34 selects the output of the adder 33. When the selection control signal SL2 is equal to zero (SL2=0), the selector 34 selects −1.

The subtracter 35 is provided for setting the output of the adder 33 as an initial value and decrements the initial value each time a burst transfer operation is performed in accordance with a burst transfer request signal BT.

A zero determination circuit 36 determines whether the output of the subtracter 35 is zero so as to output a burst transfer end instruction signal to the bus control unit 25 shown in FIG. 3 when the output of the subtracter 35 turns to zero.

An adder 37 adds the output of the adder 32 and +1. A selector 38 selects one of the output of the adder 37 and the lower order 5 bits of the start address of the first burst operation. The selecting operation of the selector 38 is controlled by a selection control signal SL3.

When the selection control signal SL3 is equal to 1 (SL3=1), the selector 38 selects the lower order 5 bits of the start address of the first burst operation. When the selection control signal SL3 is equal to zero (SL3=0), the selector 38 selects the output of the adder 37. The output of the selector 38 is supplied to a group of three-state buffers 39 which is controlled by an output enable signal EN2.

FIG. 7 is an illustration for explaining an operation of the DMA controller 20 shown in FIG. 3. Shown in FIG. 7 are burst transfer operations performed when the start address of the first burst transfer operation is $0_{10}$ which corresponds to the binary numeral $000\ldots000_2$ and is also represented by the hexadecimal numeral $(00000000_{16})$ and the number of bytes to be transferred is $96_{10}$ which corresponds to the binary numeral $000\ldots01100000_2$. Shown in FIG. 7 are the start address which is output to the external address bus 8, the types of data output to the external data bus 9 and the number of the burst transfer operations.

In the example shown in FIG. 7, the higher order 27 bits of the start address of the first burst transfer operation, which are $000\ldots000_2$ corresponding to the hexadecimal numeral $(00000000_{16})$, are supplied from the register unit 24 to the address unit 22.

In this case, the selection control signal SL1 supplied to the selector 28 is set to 1 (SEL1=1). Thus, the selector 28 selects the higher order 27 bits of the first address of the first burst operation which are $000\ldots000_2$. Consequently, the higher order 27 bits of the first address of the first burst transfer operation which are $000\ldots000_2$ are set to the adder 29 as an initial value. At the same time, the higher order 27 bits of the first address of the first burst transfer operation which are $000\ldots000_2$ are output, via the group of three-state buffers 30, to the portion of the external address bus 8 corresponding to the higher order 27 bits.

Additionally, the lower order 5 bits, $00000_2$, of the start address of the first burst transfer operation and the binary numeral $000\ldots01011111_2$ ($95_{10}$) which is the number ($96_{10}$) of bytes to be transferred minus one ($1_{10}$) are provided to the burst control unit 23.

In this case, the selection control signal SL3 supplied to the selector 38 is set to 1. Thus, the selector 38 selects the lower order 5 bits, $00000_2$, of the start address of the first burst transfer operation, and the lower order 5 bits are output, via the group of three-state buffers 39, to a portion of the external address bus 8 corresponding to the lower order 5 bits.

When $000\ldots0002=00000000_{16}$ is output to the external address bus 8 as the start address of the burst transfer operation as mentioned above, transfer of the sets of data D1 to D4 is performed in the order D1→D2→D3→D4 as shown in FIG. 7 with respect to the addresses $00000000_{16}$ to $0000001F_{16}$.

On the other hand, in the adder 32 of the burst control unit 23, a calculation is performed to add the lower order 5 bits $(11111_2)$ of the number of bytes transferred minus one to the lower order 5 bits $(00000_2)$ of the start address of the burst transfer operation $(11111_2+00000_2=11111_2)$. As a result, the operation $11111_2+00001_2=100000_2$ is performed by the adder 37, and the lower order 5 bits $00000_2$ of the result $100000_2$ are supplied to the selector 38.

Additionally, the operation is performed by the adder 33 to add the higher order 27 bits $(000\ldots010_2)$ of the number of bytes transferred minus one to the carry C $(000\ldots000_2)$ of the adder 32 $(000\ldots010_2+000\ldots000_2=000\ldots010_2)$. The result is supplied to the subtractor 35, and is set as an initial value.

At this time, the output of the subtracter 35 is $2_{10}$, and the zero determination circuit 36 does not output the burst transfer end instruction signal. Thus, the bus control unit 25 does not end the burst transfer operation, and sends a second burst transfer request to the address unit 22 and the burst control unit 23.

As a result, the operation is performed by the adder 29 to add $+1_{10}$ $(000\ldots001_2)$ which is supplied by the selector 28 to the initial value $(000\ldots000_2)$ which comprises 27 bits $(000\ldots000_2+000\ldots001_2=000\ldots001_2)$. The result $000\ldots001_2$ which comprises 27 bits is output to the portion of the external address bus 8 corresponding to the higher order 27 bits.

Additionally, in the adder 37 of the burst control unit 23, the operation is performed to add $+1_{10}$ $(00001_2)$ to the output $(11111_2)$ of the adder 32 $(11111_2+00001_2=100000_2)$. Then, the lower 5 bits $00000_2$ of the result $100000_2$ are output, via the group of three-state buffers 39, to the lower order 5 bits of the external address bus 8 corresponding to the lower order 5 bits.

When $000\ldots0100000_2=00000020_{16}$ is output to the external address bus 8 as the start address of the burst transfer operation as mentioned above, transfer of the sets of data D5 to D8 is performed in the order D5→D6→D7→D8 as shown in FIG. 7 with respect to the addresses $00000020_{16}$ to $0000003F_{16}$.

On the other hand, the operation is performed by the subtracter 35 to subtract $000\ldots001_2$ from the previous output $(000\ldots010_2)$ of the subtracter 35 $(000\ldots010_2-000\ldots001_2=000\ldots001_2)$, At this time, the result of operation performed by the subtracter 35 is $1_{10}$, and the zero determination circuit 36 does not output the burst transfer end instruction signal. Thus, the bus control unit 25 does not end the burst transfer operation, and sends a third burst transfer request to the address unit 22 and the burst control unit 23.

As a result, the operation is performed by the adder 29 to add $+1_{10}$ $(000\ldots001_2)$ which is supplied by the selector 28 to the previous output of $(000\ldots001_2)$ of the adder 29 which comprises 27 bits $(000\ldots001_2+000\ldots001_2=000\ldots010_2)$. The result $000\ldots010_2$ comprises 27 bits is output to the portion of the external address bus 8 corresponding to the higher order 27 bits.

Additionally, the lower order 5 bits $00000_2$ of the output $100000_2$ of the adder 37 in the burst control unit 23 is output, via the group of three-state buffers 39, to the lower order 5 bits of the external address bus 8 corresponding to the lower order 5 bits.

When $000\ldots01000000_2=00000040_{16}$ is output to the external address bus 8 as the start address of the burst transfer operation as mentioned above, transfer of the sets of data D9 to D12 is performed in the order D9→D10→D11→D12 as shown in FIG. 7 with respect to the addresses $00000040_{16}$ to $0000005F_{16}$.

On the other hand, the operation is performed by the subtracter 35 to subtract $000\ldots001_2$ from the previous output $(000\ldots001_2)$ of the subtracter 35 $(000\ldots001_2-000\ldots001_2=000\ldots000_2)$, At this time, the result of operation performed by the subtracter 35 is $0_{10}$, and the zero determination circuit 36 outputs the burst transfer end instruction signal. Thus, the bus control unit 25 ends the burst transfer operation to initiate the end operation of the burst transfer operation so that a fourth burst transfer operation is not performed.

FIG. 8 is an illustration for explaining another operation of the DMA controller 20 shown in FIG. 3. Shown in FIG. 8 are burst transfer operations performed when the start address of the first burst transfer operation is $3_{10}$ which corresponds to the binary numeral $000\ldots011_2$ and is also represented by the hexadecimal numeral $(00000003_{16})$ and the number of bytes to be transferred is $96_{10}$ which corresponds to the binary numeral $000\ldots01100000_2$. Shown in FIG. 8 are the start address which is output to the external address bus 8, the types of data output to the external data bus 9 and the number of the burst transfer operations.

In the example shown in FIG. 8, the higher order 27 bits of the start address of the first burst transfer operation, which are $000\ldots000_2$ corresponding to the hexadecimal numeral ($00000000_{16}$), are supplied from the register unit 24 to the address unit 22.

In this case, the selection control signal SL1 supplied to the selector 28 is set to 1 (SEL1=1). Thus, the selector 28 selects the higher order 27 bits of the first address of the first burst transfer operation which is $000 \ldots 000_2$. Consequently, the higher order 27 bits of the first address of the first burst transfer operation which are $000 \ldots 000_2$ are set to the adder 29 as an initial value. At the same time, the higher order 27 bits of the first address of the first burst transfer operation which are $000 \ldots 000_2$ are output, via the group of three-state buffers 30, to the portion of the external address bus 8 corresponding to the higher order 27 bits.

Additionally, the lower order 5 bits, $00011_2$, of the start address of the first burst transfer operation and the binary numeral $000 \ldots 01011111_2$ ($95_{10}$) which is the number ($96_{10}$) of bytes to be transferred minus one ($1_{10}$) are provided to the burst control unit 23.

In this case, the selection control signal SL3 supplied to the selector 38 is set to 1. Thus, the selector 38 selects the lower order 5 bits, $00011_2$, of the start address of the first burst transfer operation, and the lower order 5 bits are output, via the group of three-state buffers 39, to a portion of the external address bus 8 corresponding to the lower order 5 bits.

When $000 \ldots 011_2 = 00000003_{16}$ is output to the external address bus 8 as the start address of the burst transfer operation as mentioned above, transfer of the sets of data D1 to D4 is performed in the order D1→D2→D3→D4 as shown in FIG. 8 with respect to the addresses $00000000_{16}$ to $0000001F_{16}$.

On the other hand, in the adder 32 of the burst control unit 23, a calculation is performed to add the lower order 5 bits ($11111_2$) of the number of bytes transferred minus one to the lower order 5 bits ($00011_2$) of the start address of the burst transfer operation ($11111_2 + 00011_2 = 100010_2$). As a result, the operation $11111_2 + 00011_2 = 100010_2$ is performed by the adder 32, and the most significant bit 12 of the result $100010_2$ is output as a carry C and the lower order 5 bits $00010_2$ of the result $100010_2$ are supplied to the adder 37. Then, the operation $00010_2 + 00001_2 = 00011_2$ is performed by the adder 37, and the result $00011_2$ is supplied to the selector 38.

Additionally, the operation is performed by the adder 33 to add the higher order 27 bits ($000 \ldots 010_2$) of the number of bytes transferred minus one to the carry C ($000 \ldots 001_2$) of the adder 32 ($000 \ldots 010_2 + 000 \ldots 001_2 = 000 \ldots 011_2$). The result is supplied to the subtractor 35, and is set as an initial value.

At this time, the output of the subtracter 35 is $3_{10}$, and the zero determination circuit 36 does not output the burst transfer end instruction signal. Thus, the bus control unit 25 does not end the burst transfer operation, and sends a second burst transfer request to the address unit 22 and the burst control unit 23.

As a result, the operation is performed by the adder 29 to add $+1_{10}$ ($000 \ldots 001_2$) which is supplied by the selector 28 to the initial value ($000 \ldots 000_2$) which comprises 27 bits ($000 \ldots 000_2 + 000 \ldots 001_2 = 000 \ldots 001_2$). The result $000 \ldots 001_2$ which comprises 27 bits is output to the portion of the external address bus 8 corresponding to the higher order 27 bits.

Additionally, the output $00011_2$ of the adder of 37 the burst control unit is output, via the selector 38 and the group of three-state buffers 39, to the lower order 5 bits of the external address bus 8 corresponding to the lower order 5 bits.

When $000 \ldots 0100011_2 = 00000023_{16}$ is output to the external address bus 8 as the start address of the burst transfer operation as mentioned above, transfer of the sets of data D5 to D8 is performed in the order D5→D6→D7→D8 as shown in FIG. 8 with respect to the addresses $00000020_{16}$ to $0000003F_{16}$.

On the other hand, the operation is performed by the subtracter 35 to subtract $000 \ldots 001_2$ from the previous output ($000 \ldots 011_2$) of the subtracter 35 ($000 \ldots 011_2 - 000 \ldots 001_2 = 000 \ldots 010_2$).

At this time, the result of operation performed by the subtracter 35 is $2_{10}$, and the zero determination circuit 36 does not output the burst transfer end instruction signal. Thus, the bus control unit 25 does not end the burst transfer operation, and sends a third burst transfer request to the address unit 22 and the burst control unit 23.

As a result, the operation is performed by the adder 29 of the address unit 22 to add $+1_{10}$ ($000 \ldots 001_2$) which is supplied by the selector 28 to the previous output ($000 \ldots 001_2$) of the adder 29 which comprises 27 bits ($000 \ldots 001_2 + 000 \ldots 001_2 = 000 \ldots 010_2$). The result $000 \ldots 010_2$ which comprises 27 bits is output, via the group of three-state buffers 39, to the portion of the external address bus 8 corresponding to the higher order 27 bits.

Additionally, the output $00011_2$ of the adder 37 in the burst control unit 23 is output, via the selector 38 and the group of three-state buffers 39, to the lower order 5 bits of the external address bus 8 corresponding to the lower order 5 bits.

When $000 \ldots 01000011_2 = 00000043_{16}$ is output to the external address bus 8 as the start address of the burst transfer operation as mentioned above, transfer of the sets of data D9 to D12 is performed in the order D→D10→D11→D12 as shown in FIG. 8 with respect to the addresses $00000040_{16}$ to $0000005F_{16}$.

On the other hand, the operation is performed by the subtracter 35 to subtract $000 \ldots 001_2$ from the previous output ($000 \ldots 010_2$) of the subtracter 35 ($000 \ldots 010_2 + 000 \ldots 001_2 = 000 \ldots 001_2$)

At this time, the result of operation performed by the subtracter 35 is $1_{10}$, and the zero determination circuit 36 does not output the burst transfer end instruction signal. Thus, the bus control unit 25 does not end the burst transfer operation, and sends a fourth burst transfer request to the address unit 22 and the burst control unit 23.

As a result, the operation is performed by the adder 29 of the address unit 22 to add $+1_{10}$ ($000 \ldots 001_2$) which is supplied by the selector 28 to the previous output ($000 \ldots 010_2$) of the adder 29 which comprises 27 bits ($000 \ldots 010_2 + 000 \ldots 001_2 = 000 \ldots 011_2$) The result $000 \ldots 011_2$ which comprises 27 bits is output to the portion of the external address bus 8 corresponding to the higher order 27 bits.

Additionally, the output $00011_2$ of the adder 37 in the burst control unit 23 is output, via the selector 38 and the group of three-state buffers 39, to the lower order 5 bits of the external address bus 8 corresponding to the lower order 5 bits.

When $000 \ldots 01100011_2 = 00000063_{16}$ is output to the external address bus 8 as the start address of the burst transfer operation as mentioned above, transfer of the sets of data D13 to D16 is performed in the order D13→D14→D15→D16 as shown in FIG. 8 with respect to the addresses $00000060_{16}$ to $0000007F_{16}$.

On the other hand, the operation is performed by the subtracter 35 to subtract $000 \ldots 001_2$ from the previous output (000 . . . $001_2$) of the subtracter 35 (000 . . . $001_2$–000 . . . $001_2$=000 . . . $000_2$).

At this time, the result of operation performed by the subtracter 35 is $0_{10}$, and the zero determination circuit 36 outputs the burst transfer end instruction signal. Thus, the bus control unit 25 ends the burst transfer operation to initiate the end operation of the burst transfer operation so that a fifth burst transfer operation is not performed.

As mentioned above, according to the DMA controller 20 of the present embodiment, the higher order 27 bits of the start address of the second and later burst transfer operations are calculated by the address unit 22. The portion corresponding to the higher order 27 bits represents an address of a memory cell area which is a unit of burst transfer. Additionally, the lower order 5 bits of the start address of the second and later burst transfer operations are calculated by the burst control unit 23.

Accordingly, there is no need to calculate the address for each clock pulse when a plurality of burst transfer operations, in each of which data including an arbitrary number of bytes is transferred, can be consecutively performed with an arbitrary start address. Thus, there is no need to provide an adder having an operation speed higher than that of the adder provided in the conventional burst transfer control unit.

The present invention is not limited to the specifically disclosed embodiments, and variations and modifications may be made without departing from the scope of the invention.

What is claimed is:

1. A data transfer control method for controlling transfer of data between memories by a plurality of consecutive burst transfer operations performed on data stored in consecutive addresses, each of said burst transfer operations being performed on the data stored in a respective one of a plurality of memory cell areas, each of which corresponds to a unit of burst transfer, said data transfer control method comprising the steps of:

a) calculating a first address representing an address of one of said memory cell areas, said first address being a higher order part of a start address of a second or later burst transfer operation; and b) calculating a second address representing an address of one of a plurality of memory cells provided in said one of said memory cell areas, said second address being a lower order part of the start address of the second or later burst transfer operation, wherein a data transfer operation is started from said one of said memory cells and a carry is output which changes the calculation of the first address in accordance with a result of calculating the second address.

2. The data transfer control method as claimed in claim 1, wherein each of said memory cells has a capacity of m bits and is provided with addresses, each of which comprises n bits, an address of each of said memory cell areas being represented by higher order n-x bits, a burst transfer operation being performed based on a word length being $2^{x-y}*m$ bits and a burst length being $2^y$, where m, n, x and y are integers satisfying a relationship n>x>y≧1, wherein a calculation of step a) is performed by incrementing a first higher order value represented by higher order n-x bits of a start address of a first burst transfer operation each time a request for a burst transfer operation is made; and a calculation of step b) is performed by summing a first lower order value represented by lower order x bits of a number of addresses from which data is to be transferred and a second lower order value represented by lower order x bits of the start address of the first burst transfer operation.

3. The data transfer control method as claimed in claim 2, further comprising the step of:

c) controlling the number of burst transfer operations to be performed after the second burst transfer operation by calculating a number of burst transfer operations after the second burst transfer operation based on the number of addresses from which the data is to be transferred and the start address of the first burst transfer operation.

4. The data transfer control method as claimed in claim 3, wherein step c) includes the steps of:

c-1) calculating a number of burst transfer operations after the second burst transfer operation based on said first lower order value and said second lower order value; and c-2) decrementing the number of burst transfer operations to be performed each time a request for a burst transfer operation is made so as to instruct an end of the burst transfer operations when the number of burst transfer operations to be performed becomes zero.

5. The data transfer control method as claimed in claim 4, wherein a calculation of the number of burst transfer operations to be performed is performed by summing a second higher order value represented by higher order n-x bits of the number of addresses from which data is to be transferred, minus one and a first value represented by (x+1)th order of a second value obtained by summing said second lower order value and a third lower order value represented by lower order x bits of the number of addresses, from which the data is to be transferred, minus one.

6. A data transfer control apparatus to control transfer of data between memories by a plurality of consecutive burst transfer operations performed on data stored in consecutive addresses, each of said burst transfer operations being performed on the data stored in a respective one of a plurality of memory cell areas, each of which corresponds to a unit of burst transfer, said data transfer control apparatus comprising:

a first address calculating unit calculating a first address representing an address of one of said memory cell areas, said first address being a higher order part of a start address of a second or later burst transfer operation; and a second address calculating unit calculating a second address representing an address of one of a plurality of memory cells provided in said one of said memory cell areas, said second address being a lower order part of the start address of the second or later burst transfer operation, wherein a data transfer operation is started from said one of said memory cells and a carry is output which changes the calculation of the first address in accordance with a result of calculating the second address.

7. The data transfer control apparatus as claimed in claim 6, wherein each of said memory cells has a capacity of m bits and is provided with addresses, each of which comprises n bits, an address of each of said memory cell areas being represented by higher order n-x bits, a burst transfer operation being performed based on a word length being $2^{x-y}*m$ bits and a burst length being $2^y$, where m, n, x and y are integers satisfying a relationship n>x>y≧1, wherein said first address calculating unit comprises a first adder incrementing a first higher order value represented by higher order n-x bits of a start address of a first burst transfer operation each time a request for a burst transfer operation is made; and said second address calculating unit sums a first lower order value represented by lower order x bits of a number of addresses from which data is transferred and a second lower order value represented by lower order x bits of the start address of the first burst transfer operation.

8. The data transfer control apparatus as claimed in claim 7, further comprising:

a burst control unit controlling the number of burst transfer operations to be performed after the second burst transfer operation by calculating a number of burst transfer operations after the second burst transfer operation based on the number of addresses from which the data is to be transferred and the start address of the first burst transfer operation.

9. The data transfer control apparatus as claimed in claim 8, wherein said burst control unit includes:

a second adder summing said second lower order value and a third lower order value represented by lower order x bits of the number of addresses from which the data is to be transferred, minus one;

a third adder summing a carry of said second adder and a second higher order value represented by higher order n-x bits of the number of addresses from which data is to be transferred, minus one;

a subtracter decrementing the number of burst transfer operations to be performed each time a request for a burst transfer operation is made, an initial value of said subtracter being set to an output of said third adder; and a determination circuit determining whether an output of said subtracter is zero so as to output a signal instructing an end of a burst transfer when the output of said subtracter is zero.

10. The data transfer control apparatus as claimed in claim 9, wherein said second address calculating unit includes a fourth adder adding one to an output of said second adder.

11. A data transfer control method, comprising the steps of:

calculating a first address representing an address of a memory cell area, said first address being a higher order part of a start address of a second or later burst transfer operation; and calculating a second address representing an address of one of a plurality of memory cells provided in said memory cell area, said second address being a lower order part of the start address of the second or later burst transfer operation, wherein a carry is output which changes the calculation of the first address in accordance with a result of calculating the second address.

12. A data transfer control apparatus, comprising:

a first address calculating unit to calculate a first address of one memory cell area, said first address being a higher order part of a start address of a second or later burst transfer operation; and a second address calculating unit to calculate a second address representing an address of one of a plurality of memory cells provided in said memory cell area, said second address being a lower order part of the start address of the second or later burst transfer operation, wherein a carry is output which changes the calculation of the first address in accordance with a result of calculating the second address.

\* \* \* \* \*

UNITED STATES PATENT AND TRADEMARK OFFICE
CERTIFICATE OF CORRECTION

PATENT NO.: 6,009,493
DATED : December 28, 1999
INVENTOR(S): Hiroyuki FUJIYAMA

It is certified that error appears in the above-identified patent and that said Letters Patent is hereby corrected as shown below:

On the title page, [56] References Cited, U.S. Patent documents, delete:

| | | | |
|---|---|---|---|
| 5,054,565 | 10/1991 | Kinnan | 175/19 |
| 5,485,889 | 1/1996 | Gray | 174/61 |
| 5,535,835 | 7/1996 | Walker | 175/73 |

Signed and Sealed this

Twenty-ninth Day of August, 2000

*Attest:*

Q. TODD DICKINSON

*Attesting Officer*  *Director of Patents and Trademarks*